United States Patent
Marquette

[15] 3,659,887
[45] May 2, 1972

[54] DETACHABLE PROTECTOR FOR STEEL BODIES

[72] Inventor: Russell C. Marquette, 2423 East 15th St. Apt. A, Tulsa, Okla. 74104

[22] Filed: Nov. 5, 1969

[21] Appl. No.: 874,115

[52] U.S. Cl. ................................................293/1, 293/62
[51] Int. Cl. ................................................B60r 19/08
[58] Field of Search ..................293/1, 54 D, 56 M, 71, 62; 248/206 A, 345.1; 114/219

[56] References Cited

UNITED STATES PATENTS

| | | |
|---|---|---|
| 1,560,040 | 11/1925 | Cerf ........................................293/71 |
| 3,147,176 | 9/1964 | Haslam ....................................161/39 |
| 3,243,223 | 3/1966 | Hoshell ....................................49/460 |
| 3,325,639 | 6/1967 | King .....................................240/52.15 |
| 3,473,836 | 10/1969 | Halter ......................................293/60 |
| 2,935,855 | 5/1960 | Reid ..........................................61/48 |

Primary Examiner—Arthur L. La Point
Assistant Examiner—Robert Saifer
Attorney—Head & Johnson

[57] ABSTRACT

A detachable side protector comprises a base having slidably received on the upper surface thereof and magnetically held thereto two extension strips projecting horizontally therefrom in opposite directions. The protector is magnetically held on the exterior surface of a steel body to prevent damage thereto during the opening of doors on neighboring vehicles.

2 Claims, 9 Drawing Figures

Patented May 2, 1972
3,659,887
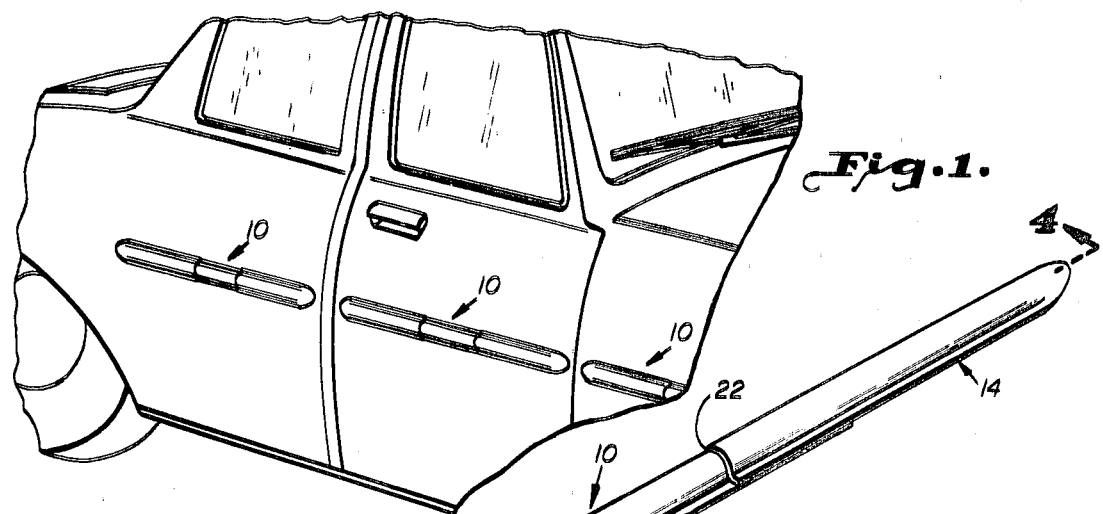
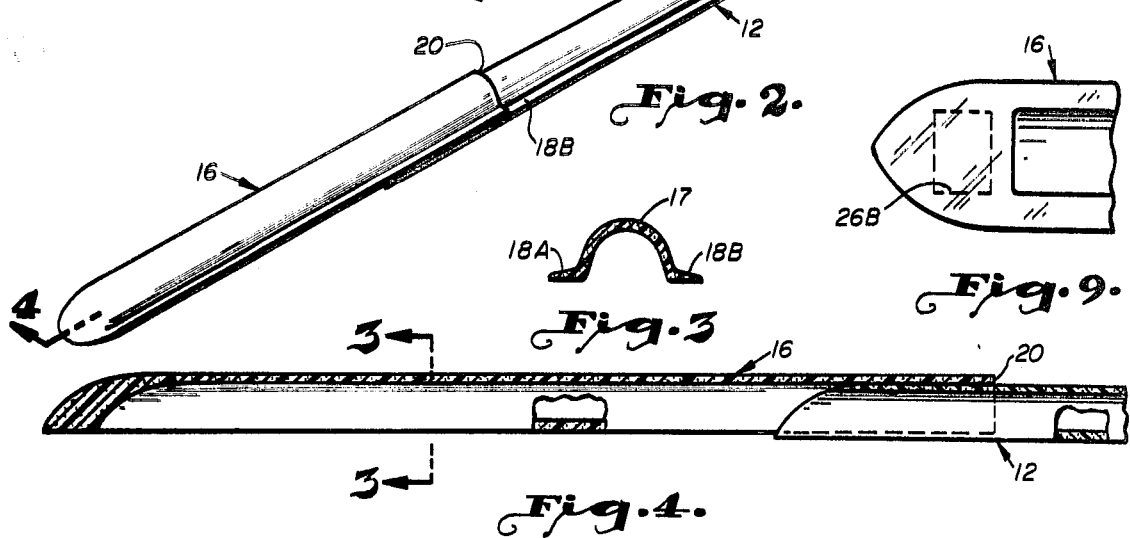
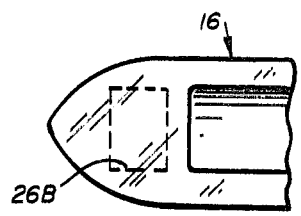
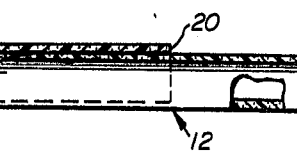
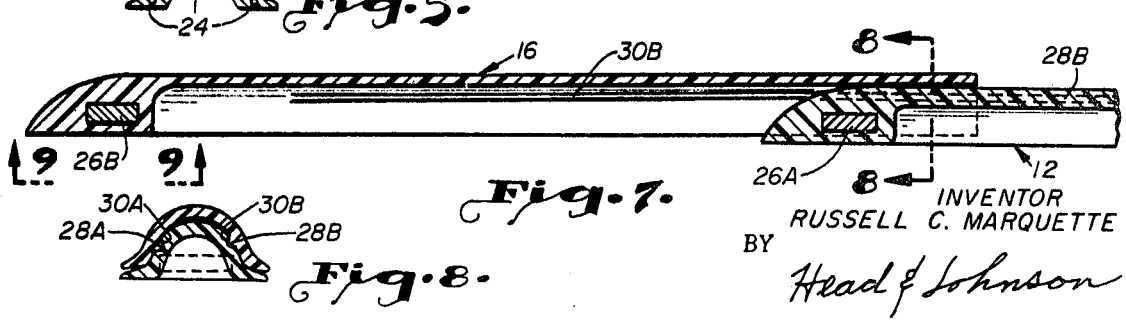
INVENTOR
RUSSELL C. MARQUETTE
BY
Head & Johnson
ATTORNEYS

3,659,887

DETACHABLE PROTECTOR FOR STEEL BODIES

BACKGROUND OF THE INVENTION

This invention relates to a novel and improved means for protecting the exterior finish of a vehicle from damage caused by neighboring vehicles in parking lots, garages, or the like.

Due to the large and ever-growing number of motor vehicles, it has become a common parking lot practice to park them as close as possible. Consequentially, when a vehicle is being entered or exited, the door of one vehicle often comes in contact with the side of an adjacent vehicle. This door contact often results in a marring or chipping of the exterior finish of the vehicle hit causing a diminution in the eye pleasing appearance thereof and also a reduction in the resale value thereof. This chipping and marring of the exterior surface of the vehicle is aggrevated by the fact that many vehicles are presently being manufactured without any protecting devices longitudinally attached along the exterior sides such as strips of chrome.

It is therefore an object of this invention to present a protector which can be attached to the side of a vehicle during parking and removed therefrom when the car is being driven.

It is a second object of this invention to present a protector which will not mar the surface of the vehicle and which is magnetically held to the exterior thereof.

SUMMARY OF THE INVENTION

Generally the protector comprises a base strip having slidably received on the upper surface thereof two extension strips extending in opposite directions. The strips are magnetically held to the exterior of the vehicle and are outwardly arcuate in cross section to receive and absorb any shock imparted thereto by the door of a neighboring vehicle being opened. The protector is fabricated from material having sufficient plasticity so that it will not mar the vehicle's finish, during attachment thereto or detachment therefrom, but will resume its original configuration after being struck.

DESCRIPTION OF THE DRAWINGS

FIG. 1 is a partial view of an automobile showing a plurality of the protectors longitudinally attached to the exterior side thereof.

FIG. 2 is a view of the protector showing the various components thereof.

FIG. 3 is a cross-sectional view of the protector taken along line 3—3 of FIG. 4.

FIG. 4 is a partial cross-sectional view of the apparatus taken along the line 4—4 of FIG. 2 and showing the specific configuration of the ends of the various sections of the protector.

FIG. 5 is a cross-sectional view of the protector showing one embodiment of the invention taken along line 5—5 of FIG. 6.

FIG. 6 is a cross-sectional view of the protector specifically showing an alternate embodiment of this invention.

FIG. 7 is a cross-sectional view of the protector specifically showing a third embodiment of the invention.

FIG. 8 is a cross-sectional view of the protector taken along line 8—8 of FIG. 7.

FIG. 9 is a view of the protector taken along line 9—9 of FIG. 7.

DETAILED DESCRIPTION OF THE PREFERRED EMBODIMENT

FIG. 1 shows three of the protectors 10 longitudinally affixed in horizontal alignment along the exterior side of a vehicle at the outermost portion thereof so as to receive any shock imparted thereto such as by a door from an adjacent vehicle being banged thereagainst during the opening thereof.

As illustrated in FIG. 2, the protector 10 is composed of elongated base strip 12 having slidably received on the upper surface thereof in a common plane and projecting outwardly therefrom in opposite directions a forward extension strip 14 and a rearward extension strip 16. Each of the strips 12, 14, and 16 have a convexly arcuate-in-cross-section portion 17 bordered along each longitudinal edge thereof by horizontal flanges 18A and 18B extending outwardly to provide a contact surface face for attachment to the exterior side of a vehicle.

Both of the ends of the base strip 12 and the outer ends of each of the extension strips 14 and 16 are downwardly rounded to increase the aesthetic appearance of the protector 10. The inner ends 20 and 22 of the extension strips are perpendicular to the length thereof in order to permit slidable saddling thereof on the upper surface of the base strip 12.

Although the strips may be fabricated from a variety of materials, it has been found that elongated strips formed into the desired shape by the extrusion molding of granulars of polyethylene possess sufficient plasticity to receive and absorb shocks without permanent deformation thereof and also are sufficiently soft so as not to mar the exterior finish of the vehicle during attachment to and detachment from the vehicle.

Numerous methods of slidably saddling the extension strips on the base strip and of detachably attaching the protector to the exterior of the vehicle can be employed, several of which will hereafter be discussed.

In the first embodiment, the strips are fabricated from a blend of ferrite powder and polyethylene plastic extrusion molded into the desired elongated arcuate shapes. The strips are then passed through a magnetizer wherein the ferrite power is magnetized to transform the strips into permanent magnets, with the north poles on the upper surface of each strip and the south poles on the bottom surface thereof so that the upper surface of the base 12 will attract and hold the bottom surface of the extension strips received thereover as is illustrated in FIG. 4. Optimum protection length of the protector 10 is attained by slidable travel of the extension strips 14 and 16 relative to the base 12, and the strips 12, 14, and 16 are magnetically retained on the exterior surface of the vehicle by the magnetic properties of the flanges 18A and 18B.

In a second embodiment, the strips are molded into the desired convexly arcuate elongated shape having longitudinal horizontal flanges. In each of the strips 12, 14, and 16 unitary magnetic rods 25 are then embedded in the crown of the arcuate section and each of the flanges along the entire length thereof as is shown in FIG. 5. The extruded polyethylene surrounding the magnetic rods 24 prevents marring of the vehicle's finish while the magnetic attraction force of the rods which is not impaired by the surrounding polyethylene material holds the respective base strips and extension strips mutually together as is illustrated in FIG. 6 and also to the side of the vehicle.

In still a further embodiment, the strips are again molded into the desired shape by the extruding of polyethylene. Thereafter permanent magnets 26A and 26B are embedded in each of the ends of the base strip and also in the outer ends of the extension strips. Here again the polyethylene completely surrounds the magnets so as to prevent marring of the vehicle's surface during attachment and removal of the protector 10.

The permanent magnets serve to magnetically hold the strips to the side of the car. In this embodiment, the slidable saddling of the extension strips to the base strips is accomplished by longitudinal grooves 28A and 28B laterally spaced and running parallel along the length of the base strip 12 within the arcuate portion thereof which accept parallel spaced longitudinal inwardly protecting ridges 30A and 30B within the interior of the arcuate section of each of the extension strips as can best be seen in the cross section view of FIG. 8.

In operation, when an automobile is parked such as in a parking lot, the car operator adjusts the length of the protector by slidably traveling the extension strips 14 and 16 relative to the base strip to attain the optimum protection for the vehicle and then merely attaches a protective device along the exterior side of the vehicle at points susceptible to being hit by the edge of a door of a neighboring vehicle being opened.

When a door of a neighboring vehicle is opened the strip will receive and, due to the plasticity thereof, absorb the shock and consequently prevent any marring of the vehicle's exterior finish.

When there is no need for the protective device, such as when the car is being driven, the protector can be collapsed, that is, the extension strips can be stacked one on top of each other, and then onto the upper surface of the base strip to facilitate storage thereof such as in the glove compartment of the vehicle During the description of the preferred embodiment of this invention specific language has been used for the sake of clarity. However, it is to be understood that such words are not words of limitation and include equivalents which operate in a similar manner to accomplish a similar purpose. For example, it is obvious that rather than having the extension strips, the device could be just as easily fabricated and used as a solitary and unitary strip. Also, rather than using magnetic attraction to hold the device to the automobiles, other means such as adhesives could be used.

Also it is obvious that the protecting characteristics of the protector could be attained by reversing the relative saddling relationship between the base strips and extension strip; that is the base strip could just as easily be slidably saddled on the upper surface of the extension strips.

What is claimed:

1. An apparatus for protecting the exterior of a steel body comprising:

a base strip of resilient material, said strip having an elongated arcuate-in-cross-section portion bordered along each longitudinal edge thereof by integral flat horizontal flanges extending outwardly therefrom to form contact surfaces for attachment of said base strip to the exterior of said vehicle, said base strip having unitary lengths of magnetic rods embedded from end to end in the crown of said arcuate portion and in said flanges, said base strip being magnetically attached to the exterior of said body; and extension strips of resilient material, said extension strips having an elongated arcuate-in-cross-section portion mating the curvature of said base strip and bordered along the longitudinal edges thereof by integral flat horizontal flanges extending outwardly therefrom to form contact surfaces for attachment of said extension strips to said exterior of said body, said extension strips having unitary lengths of magnetic rod embedded from end to end in the crown of said arcuate portion and in said flanges, said extension strips being magnetically saddled on the upper surface of said base strip and slidable in opposite directions to vary the longitudinal length of said apparatus.

2. A detachable apparatus for protecting the exterior of a steel body comprising:

an elongated base strip of resilient paramagnetic material, said strip having an elongated arcuate-in-cross-section portion bordered along each longitudinal edge thereof by an integral flat horizontal flange extending outwardly therefrom to form contact surfaces for attachment of said base strip to the exterior of said vehicle, said strip being magnetized whereby when said flanges are placed in contact with said exterior of said body said base strip is magnetically held thereto and said arcuate portion projects outwardly from said exterior to receive and absorb any shock imparted thereto; and an extension strip of resilient paramagnetic material, said extension strip being magnetized and having an elongated arcuate-in-cross-section portion mating the curvature of said arcuate portion of said base strip and bordered along each longitudinal edge thereof by an integral flat horizontal flange extending outwardly therefrom to form contact surfaces for attachment of said extension strip to the exterior of said body, said extension strip being magnetically saddled to the upper surface of said base strip and slidable relative thereto to vary the longitudinal length of said apparatus.

* * * * *